(12) United States Patent
Armstrong et al.

(10) Patent No.: US 12,397,247 B2
(45) Date of Patent: Aug. 26, 2025

(54) UNDERDRAIN FILTERED WATER COLLECTION SYSTEMS WITH WINGED SCREEN DIFFUSERS

(71) Applicant: De Nora Water Technologies, LLC, Colmar, PA (US)

(72) Inventors: Nicholas A. Armstrong, Colmar, PA (US); Kenneth A. Marchek, Colmar, PA (US)

(73) Assignee: De Nora Water Technologies, LLC, Colmar, PA (US)

( * ) Notice: Subject to any disclaimer, the term of this patent is extended or adjusted under 35 U.S.C. 154(b) by 0 days.

(21) Appl. No.: 18/868,525

(22) PCT Filed: Jun. 2, 2023

(86) PCT No.: PCT/US2023/024258
§ 371 (c)(1),
(2) Date: Nov. 22, 2024

(87) PCT Pub. No.: WO2023/239601
PCT Pub. Date: Dec. 14, 2023

(65) Prior Publication Data
US 2025/0170499 A1    May 29, 2025

Related U.S. Application Data

(60) Provisional application No. 63/350,736, filed on Jun. 9, 2022.

(51) Int. Cl.
*B01D 24/40* (2006.01)
*B01D 24/10* (2006.01)
(Continued)

(52) U.S. Cl.
CPC ........... *B01D 24/402* (2013.01); *B01D 24/10* (2013.01); *B01D 24/425* (2013.01); *C02F 1/004* (2013.01);
(Continued)

(58) Field of Classification Search
None
See application file for complete search history.

(56) References Cited

U.S. PATENT DOCUMENTS 304,318 A  *  9/1884  Hean ................... B01D 29/111
                                              285/405
355,004 A  *  12/1886  Deutsch ............ B01D 24/4631
                                              137/545
(Continued)

FOREIGN PATENT DOCUMENTS

WO  WO-2023239601 A1 *  12/2023  .............. C02F 1/004

*Primary Examiner* — Robert J Popovics
(74) *Attorney, Agent, or Firm* — D'Ambrosio & Menon, PLLC; Usha Menon (57) ABSTRACT

An underdrain filtered water collection system includes: a pair of opposing drainpipes, each drainpipe having a plurality of collection drains; and a diffuser screen. The diffuser screen can slide within an outlet in each of the collection drains. A diffuser screen for a pressure vessel containing filter media includes: a screen pipe; a solid plate coupled to a base of the screen pipe; and a winged diffuser arranged around an outer circumference of the solid plate. The winged diffuser includes a plurality of foldable wings. The screen pipe includes a mesh screen having preconfigured interstices therethrough. Feed water flows through the screen pipe where it is directed by an inner surface of the solid plate to flow in a diffused flow through the interstices of the mesh screen and the wings.

14 Claims, 7 Drawing Sheets

(51) Int. Cl.
*B01D 24/42* (2006.01)
*C02F 1/00* (2023.01)

(52) U.S. Cl.
CPC ........ *C02F 1/006* (2013.01); *B01D 2201/202* (2013.01)

(56) References Cited

U.S. PATENT DOCUMENTS

| | | | | | |
|---|---|---|---|---|---|
| 471,811 | A | * | 3/1892 | Deutsch | B01D 24/14 210/150 |
| 478,261 | A | * | 7/1892 | Jewell et al. | B01D 24/12 210/279 |
| 484,781 | A | * | 10/1892 | Deu | B01D 24/266 210/279 |
| 512,298 | A | * | 1/1894 | Hyatt | B01D 24/14 210/118 |
| 523,585 | A | * | 7/1894 | Moore | B01D 24/42 210/275 |
| 567,249 | A | * | 9/1896 | Merrill | B01D 35/18 210/773 |
| 597,222 | A | * | 1/1898 | Rhood | C02F 1/42 137/865 |
| 607,155 | A | * | 7/1898 | Bleakly et al. | B01D 24/005 210/279 |
| 636,356 | A | * | 11/1899 | Randall | C02F 1/001 210/279 |
| 643,138 | A | * | 2/1900 | Jewell | B01D 35/28 210/279 |
| 653,160 | A | * | 7/1900 | Williamson | B01D 24/24 210/279 |
| 727,230 | A | * | 5/1903 | Underwood | B01D 37/00 210/295 |
| 886,718 | A | * | 5/1908 | Moock | B01D 35/18 210/489 |
| 919,849 | A | * | 4/1909 | Goff | B01D 24/14 210/406 |
| 1,065,782 | A | * | 6/1913 | Cronk | A01M 1/223 43/112 |
| 1,116,234 | A | * | 11/1914 | Brown | B01D 29/111 425/269 |
| 1,196,058 | A | * | 8/1916 | Widner | B01J 49/75 210/279 |
| 1,209,800 | A | * | 12/1916 | Barber | E21B 33/0355 137/236.1 |
| 1,405,406 | A | * | 2/1922 | Genter | B01D 24/4673 210/436 |
| 1,747,470 | A | * | 2/1930 | Duden | B01D 24/14 210/488 |
| 1,822,689 | A | * | 9/1931 | Bressler | C02F 1/42 210/292 |
| 1,873,594 | A | * | 8/1932 | Johnson | C02F 1/42 210/436 |
| 1,908,030 | A | * | 5/1933 | Larson | F24F 3/12 261/30 |
| 1,936,468 | A | * | 11/1933 | Folmer | A01M 1/02 D26/85 |
| 2,042,008 | A | * | 5/1936 | Kenney | C02F 1/42 210/281 |
| 2,073,847 | A | * | 3/1937 | Miller | B01D 35/18 392/479 |
| 2,098,903 | A | * | 11/1937 | Slidell | C02F 1/42 210/291 |
| 2,209,602 | A | * | 7/1940 | Jewell | B01D 24/42 210/279 |
| 2,332,965 | A | * | 10/1943 | Ducommun | B01D 29/114 210/696 |
| 2,355,815 | A | * | 8/1944 | McGill | B01D 24/40 210/191 |
| 2,360,958 | A | * | 10/1944 | Massorley | B01D 24/14 210/292 |
| 2,364,775 | A | * | 12/1944 | Brice | C02F 1/42 210/290 |
| 2,372,286 | A | * | 3/1945 | Mieras | B01D 35/005 184/6.24 |
| 2,461,619 | A | * | 2/1949 | Wolcott | B01D 24/4636 210/279 |
| 2,528,065 | A | * | 10/1950 | Lundberg | B01D 24/14 210/488 |
| 2,627,503 | A | * | 2/1953 | Anderson | C02F 1/42 210/279 |
| 2,657,121 | A | * | 10/1953 | Rollins | B01J 8/0278 422/220 |
| 2,674,376 | A | * | 4/1954 | Swan | B01D 29/114 210/435 |
| 2,743,230 | A | * | 4/1956 | Meyer | C02F 1/42 210/281 |
| 2,768,750 | A | * | 10/1956 | Kryzer | C02F 1/42 210/291 |
| 2,772,780 | A | * | 12/1956 | Penick | B01J 8/20 422/220 |
| 2,773,829 | A | * | 12/1956 | Hunting | B01J 49/60 210/678 |
| 2,973,097 | A | * | 2/1961 | Snider | B01J 19/0013 210/279 |
| 2,980,515 | A | * | 4/1961 | Horner | B01J 8/0278 422/220 |
| 3,004,668 | A | * | 10/1961 | Adams | B01D 24/14 210/293 |
| 3,158,177 | A | * | 11/1964 | Schulz | B01J 8/0278 138/37 |
| 3,170,873 | A | * | 2/1965 | May | B01D 17/045 210/323.2 |
| 3,174,623 | A | * | 3/1965 | Sloan | B01J 47/022 210/281 |
| 3,177,609 | A | * | 4/1965 | De Marco | A01M 1/223 43/112 |
| 3,240,699 | A | * | 3/1966 | Duff | B01J 49/90 210/275 |
| 3,245,537 | A | * | 4/1966 | Burgess | B01J 49/75 210/85 |
| 3,276,585 | A | * | 10/1966 | Kalinske | B01D 24/4631 210/795 |
| 3,276,590 | A | * | 10/1966 | Schmid | B01D 24/4631 210/279 |
| 3,291,311 | A | * | 12/1966 | Pratt | B01D 24/14 210/497.1 |
| 3,317,044 | A | * | 5/1967 | Marks | C02F 1/42 210/279 |
| 3,330,415 | A | * | 7/1967 | Wilke | B01D 29/39 210/236 |
| 3,363,843 | A | * | 1/1968 | Ballard | B01D 3/008 261/97 |
| 3,384,240 | A | * | 5/1968 | Berardi | B01D 24/4631 210/279 |
| 3,391,707 | A | * | 7/1968 | Riley | B01J 47/022 137/590 |
| 3,402,126 | A | * | 9/1968 | Cioffi | B01J 47/04 210/686 |
| 3,429,443 | A | * | 2/1969 | Stern | B01D 24/4631 210/288 |
| 3,451,554 | A | * | 6/1969 | Wade | B01D 24/4642 210/279 |
| 3,471,022 | A | * | 10/1969 | Conrad | B01D 29/23 210/167.14 |
| 3,472,382 | A | * | 10/1969 | Duff | B01D 24/14 210/279 |
| 3,479,146 | A | * | 11/1969 | Hochman | B01J 8/0278 422/220 |
| 3,491,882 | A | * | 1/1970 | Elam | C10G 33/06 210/791 |
| 3,498,460 | A | * | 3/1970 | Lane | B01D 24/14 210/232 |
| 3,547,270 | A | * | 12/1970 | Kass | B01D 24/4636 210/279 |
| 3,552,569 | A | * | 1/1971 | Zievers | B01J 49/05 210/189 |
| 3,554,377 | A | * | 1/1971 | Miller | B01J 47/028 210/275 |

(56) References Cited

U.S. PATENT DOCUMENTS

| | | | | |
|---|---|---|---|---|
| 3,617,558 A * | 11/1971 | Jones | B01J 49/60 | 210/279 |
| 3,625,365 A * | 12/1971 | Armstrong | B01D 24/14 | 210/279 |
| 3,669,882 A * | 6/1972 | Hirs | B01D 24/4636 | 210/189 |
| 3,704,785 A * | 12/1972 | Marsh | B01J 47/022 | 210/288 |
| 3,717,254 A * | 2/1973 | Benecke | B01J 49/09 | 210/279 |
| 3,747,768 A * | 7/1973 | Barrera | B01D 24/4876 | 210/288 |
| 3,757,954 A * | 9/1973 | Toth | B01D 24/4621 | 210/284 |
| 3,785,779 A * | 1/1974 | Li | B01J 4/001 | 422/231 |
| 3,809,247 A * | 5/1974 | Brett | B01D 24/40 | 210/288 |
| 3,826,375 A * | 7/1974 | Fournier | B01J 47/022 | 210/291 |
| 3,834,537 A * | 9/1974 | Brett | B01D 24/4642 | 210/167.14 |
| 3,847,805 A * | 11/1974 | Voedisch | B01J 8/025 | 210/189 |
| 3,886,071 A * | 5/1975 | Weis | B01D 24/14 | 210/275 |
| 3,911,064 A * | 10/1975 | McWhirter | C02F 3/26 | 261/87 |
| 3,984,327 A * | 10/1976 | May | B01D 24/14 | 210/345 |
| 3,986,292 A * | 10/1976 | Klebanoff | A01M 1/223 | 43/112 |
| 4,006,087 A * | 2/1977 | Denton | B01D 24/14 | 210/291 |
| 4,013,556 A * | 3/1977 | Evans | B01J 47/022 | 210/291 |
| 4,065,388 A * | 12/1977 | Flynn | B01J 49/60 | 210/686 |
| 4,094,790 A * | 6/1978 | Schmidt, Jr. | B01D 29/52 | 210/291 |
| 4,098,695 A * | 7/1978 | Novotny | B01D 24/14 | 210/279 |
| 4,105,555 A * | 8/1978 | Pease | B01D 24/14 | 137/599.08 |
| 4,107,044 A * | 8/1978 | Levendusky | G21F 9/12 | 976/DIG. 383 |
| 4,161,963 A * | 7/1979 | Stevens | B01D 24/14 | 422/279 |
| 4,169,793 A * | 10/1979 | Lockshaw | B01D 24/14 | 210/167.13 |
| 4,182,069 A * | 1/1980 | De Yoreo | A01M 1/04 | 43/112 |
| 4,200,536 A * | 4/1980 | Kaufman | B01D 24/4631 | 210/291 |
| 4,319,605 A * | 3/1982 | Boudin | B01J 8/02 | 137/590 |
| 4,328,833 A * | 5/1982 | Aurther | F16K 11/085 | 251/317 |
| 4,364,830 A * | 12/1982 | Roberts | B01D 24/42 | 210/268 |
| 4,414,109 A * | 11/1983 | Aurthur | B01D 24/14 | 210/278 |
| 4,478,716 A * | 10/1984 | Hasegawa | B01D 24/14 | 210/289 |
| 4,580,597 A * | 4/1986 | Cordingley | F24H 9/133 | 137/561 A |
| 4,655,242 A * | 4/1987 | Hamazaki | F16K 13/10 | 137/247.35 |
| 4,668,405 A * | 5/1987 | Boze | B01D 24/12 | 210/795 |
| 4,720,347 A * | 1/1988 | Berne | B01D 24/4631 | 210/189 |
| 4,753,726 A * | 6/1988 | Suchanek | B01D 24/4876 | 210/279 |
| 4,773,998 A * | 9/1988 | Heinrich | B01D 24/4631 | 210/279 |
| 4,848,992 A * | 7/1989 | Lebrun | B01D 46/30 | 55/516 |
| 4,877,587 A * | 10/1989 | Rhee | B01J 8/1827 | 422/135 |
| 4,933,149 A * | 6/1990 | Rhee | B01J 8/44 | 422/220 |
| 5,066,393 A * | 11/1991 | Padera | C02F 1/42 | 210/291 |
| 5,068,033 A * | 11/1991 | Tobias | B01D 24/14 | 210/345 |
| 5,098,690 A * | 3/1992 | Koves | B05B 1/18 | 239/533.1 |
| 5,203,995 A * | 4/1993 | Fernando | B01D 24/40 | 210/500.1 |
| 5,472,609 A * | 12/1995 | Field | B01J 49/60 | 210/279 |
| 5,584,998 A * | 12/1996 | Teter | B01D 24/105 | 210/405 |
| 5,637,278 A * | 6/1997 | Smith | B01D 24/167 | 210/275 |
| 5,714,062 A * | 2/1998 | Winkler | C02F 3/20 | 210/220 |
| 5,723,043 A * | 3/1998 | Hawk | C02F 3/06 | 210/275 |
| 5,762,785 A * | 6/1998 | Garrigos Ruiz | B01D 24/14 | 210/287 |
| 5,779,773 A * | 7/1998 | Cam | B01J 8/0453 | 55/494 |
| 5,833,867 A * | 11/1998 | Hensley | B01D 24/4689 | 210/275 |
| 5,873,929 A * | 2/1999 | Andreani | B01D 53/0431 | 422/177 |
| 5,932,092 A * | 8/1999 | Hawk | C02F 3/06 | 210/287 |
| 6,055,766 A * | 5/2000 | Nolen | A01M 1/023 | 43/112 |
| 6,059,967 A * | 5/2000 | Field | B01D 24/4631 | 210/275 |
| 6,319,413 B1 * | 11/2001 | Xia | B01D 29/114 | 210/678 |
| 6,428,690 B1 * | 8/2002 | Tse | B01D 24/4631 | 210/275 |
| 6,491,817 B1 * | 12/2002 | Benesi | B01D 25/28 | 210/231 |
| 6,605,211 B1 * | 8/2003 | Slopack | B01D 24/4631 | 210/275 |
| 6,685,826 B1 * | 2/2004 | James | B01J 19/30 | 210/150 |
| 6,709,574 B2 * | 3/2004 | James | C02F 3/10 | 210/150 |
| 6,739,351 B1 * | 5/2004 | Rosser | B01F 21/22 | 138/45 |
| 6,790,357 B2 * | 9/2004 | Norell | B01D 24/22 | 210/345 |
| 6,877,726 B1 * | 4/2005 | Rindt | B01F 25/45211 | 261/111 |
| 7,022,230 B2 * | 4/2006 | Imai | B01D 24/14 | 210/291 |
| 7,097,766 B2 * | 8/2006 | Moya | B01D 24/14 | 210/280 |
| 7,160,460 B2 * | 1/2007 | Terry, III | C02F 3/288 | 210/615 |
| 7,217,363 B2 * | 5/2007 | Mulvey | B01D 24/14 | 210/279 |
| 7,303,682 B2 * | 12/2007 | Paananen | G01N 30/6017 | 210/291 |
| 7,329,350 B2 * | 2/2008 | James | C02F 3/087 | 210/150 |
| 7,341,662 B2 * | 3/2008 | Tolley | B01D 24/407 | 210/275 |
| 7,468,134 B2 * | 12/2008 | Hoang | A01K 63/045 | 210/287 |

(56) References Cited

U.S. PATENT DOCUMENTS

| | | | | |
|---|---|---|---|---|
| 7,513,993 B2* | 4/2009 | Goodwin | B01D 24/105 | 210/167.13 |
| 8,152,998 B2* | 4/2012 | Xia | B01D 24/4689 | 210/678 |
| D673,647 S * | 1/2013 | Tandon | D23/209 | |
| 8,349,183 B2* | 1/2013 | Field | B01J 47/14 | 210/291 |
| D680,616 S * | 4/2013 | Ben-Horin | D23/262 | |
| 8,936,721 B2* | 1/2015 | Renaud | B29C 48/09 | 210/167.13 |
| 8,992,775 B2* | 3/2015 | Swindell | B01D 29/21 | 210/411 |
| 9,017,559 B2* | 4/2015 | Mimura | B01D 24/12 | 210/151 |
| 9,034,084 B2* | 5/2015 | Lomax | B01D 53/0446 | 96/152 |
| 9,108,126 B2* | 8/2015 | Renaud | B29C 49/04114 | |
| 9,174,149 B2* | 11/2015 | Lee | B01D 24/4631 | |
| 9,199,213 B2* | 12/2015 | Boyak | B01J 8/025 | |
| 9,409,137 B1* | 8/2016 | Williams | B01J 8/008 | |
| 9,744,511 B2* | 8/2017 | Palmer | B01J 8/0257 | |
| 9,827,513 B2* | 11/2017 | Ekholm | F16L 55/07 | |
| 9,943,784 B2* | 4/2018 | Kirk | B05B 1/3405 | |
| 10,053,960 B2* | 8/2018 | Romero | E21B 21/003 | |
| 10,138,136 B2* | 11/2018 | Petty | C02F 1/002 | |
| 10,227,745 B2* | 3/2019 | Sifuentes Sanchez | E02B 8/02 | |
| 10,406,458 B1* | 9/2019 | Nehlen, III | B01D 29/17 | |
| 10,427,076 B2* | 10/2019 | Swindell | B01D 29/21 | |
| 10,605,409 B2* | 3/2020 | Veto | B64D 1/16 | |
| 10,765,972 B2* | 9/2020 | Faber | B01D 24/26 | |
| 10,807,023 B2* | 10/2020 | Larsson | B01D 24/46 | |
| 10,814,255 B1* | 10/2020 | Nehlen, III | B01D 29/52 | |
| 10,814,256 B1* | 10/2020 | Nehlen, III | B01D 29/52 | |
| 10,850,216 B1* | 12/2020 | Nehlen, III | B01D 29/17 | |
| 10,888,806 B2* | 1/2021 | Bloomfield | B01D 24/4631 | |
| 10,933,353 B2* | 3/2021 | Saul | B01D 24/12 | |
| 10,981,091 B1* | 4/2021 | Nehlen, III | B01D 37/02 | |
| 10,981,802 B2* | 4/2021 | Craw | C02F 1/006 | |
| 11,065,566 B2* | 7/2021 | Nehlen, III | B01D 29/906 | |
| 11,291,932 B2* | 4/2022 | Bloomfield | B01D 21/267 | |
| 11,471,798 B2* | 10/2022 | Vallejo | C02F 1/006 | |
| 11,673,079 B2* | 6/2023 | Nehlen, III | B01D 29/52 | 210/323.2 |
| 11,826,678 B2* | 11/2023 | Saul | B01D 24/24 | |
| 11,827,530 B2* | 11/2023 | Itai | B01D 24/14 | |
| 11,883,771 B2* | 1/2024 | Henderson | B01D 24/14 | |
| 12,024,309 B2* | 7/2024 | Bonte | B60K 15/03 | |
| 12,059,641 B2* | 8/2024 | Nieuwoudt | B01D 3/008 | |
| 12,128,344 B2* | 10/2024 | Henderson | B01D 24/14 | |
| 12,194,453 B2* | 1/2025 | Sun | B01D 53/047 | |
| 2001/0052503 A1* | 12/2001 | DeLonge | C02F 1/283 | 210/749 |
| 2002/0185427 A1* | 12/2002 | Norell | B01D 24/24 | 210/263 |
| 2003/0024885 A1* | 2/2003 | Ekholm | B01D 3/008 | 210/418 |
| 2003/0034286 A1 | 2/2003 | Butler | | |
| 2003/0164342 A1* | 9/2003 | Mason | B01D 29/114 | 210/323.2 |
| 2004/0195162 A1* | 10/2004 | Imai | B01D 24/405 | 210/456 |
| 2004/0238429 A1* | 12/2004 | Mulvey | B01D 24/14 | 210/275 |
| 2004/0238430 A1* | 12/2004 | Moya | B01D 24/46 | 210/287 |
| 2005/0035071 A1* | 2/2005 | Tolley | B01D 24/407 | 210/793 |
| 2006/0124527 A1* | 6/2006 | Goodwin | B01D 29/52 | 210/289 |
| 2006/0151366 A1* | 7/2006 | Hoang | A01K 63/045 | 210/95 |
| 2007/0163939 A1* | 7/2007 | Field | B01D 24/14 | 210/292 |
| 2007/0251876 A1* | 11/2007 | Krogue | B01D 39/2062 | 210/497.1 |
| 2008/0099413 A1* | 5/2008 | Tolley | B01D 24/407 | 210/793 |
| 2009/0294356 A1* | 12/2009 | Beggs | C02F 3/04 | 210/275 |
| 2010/0206795 A1* | 8/2010 | Chernoff | C02F 1/004 | 210/232 |
| 2010/0320159 A1* | 12/2010 | Lee | B01D 24/4631 | 210/792 |
| 2011/0303603 A1* | 12/2011 | Field | B01J 47/14 | 210/292 |
| 2013/0064731 A1* | 3/2013 | Boyak | B01J 8/025 | 422/239 |
| 2014/0027369 A1* | 1/2014 | Saul | B01D 24/22 | 210/293 |
| 2014/0290492 A1* | 10/2014 | Lomax | B01D 53/0462 | 96/144 |
| 2016/0038856 A1* | 2/2016 | Ekholm | B01D 35/00 | 137/15.04 |
| 2016/0339362 A1* | 11/2016 | Kirk | B01D 24/40 | |
| 2017/0001131 A1* | 1/2017 | Bosisio | B01D 24/105 | |
| 2018/0133624 A1* | 5/2018 | Malone | B01D 24/4636 | |
| 2018/0298576 A1* | 10/2018 | Sifuentes Sanchez | E02B 8/02 | |
| 2019/0169044 A1* | 6/2019 | Craw | C02F 1/006 | |
| 2020/0179829 A1* | 6/2020 | Friend | B01D 24/4636 | |
| 2021/0002145 A1* | 1/2021 | Chen | C02F 1/001 | |
| 2021/0214240 A1* | 7/2021 | Itai | B01D 24/402 | |
| 2021/0354056 A1* | 11/2021 | Dehn | B01D 29/52 | |
| 2021/0354057 A1* | 11/2021 | Saul | B01D 24/24 | |
| 2022/0001306 A1 | 1/2022 | Naidu | | |
| 2022/0096968 A1* | 3/2022 | Wieseneder | B01D 24/12 | |
| 2022/0143526 A1* | 5/2022 | Nieuwoudt | B01D 3/26 | |
| 2023/0105431 A1* | 4/2023 | Dehn | B01D 24/14 | 210/345 |
| 2023/0271113 A1* | 8/2023 | Kamath | G06F 30/17 | 210/268 |
| 2024/0131456 A1* | 4/2024 | Nehlen, III | B01D 29/66 | |
| 2024/0189742 A1* | 6/2024 | Phillips | B01D 24/24 | |
| 2024/0226782 A9* | 7/2024 | Nehlen, III | B01D 35/30 | |
| 2025/0170499 A1* | 5/2025 | Armstrong | B01D 29/925 | |

* cited by examiner

UNDERDRAIN FILTERED WATER COLLECTION SYSTEMS WITH WINGED SCREEN DIFFUSERS

TECHNICAL FIELD

The present invention relates to an apparatus and systems for water treatment. More particularly, the present invention relates to an underdrain filtered water collection system and a diffuser screen for pressure vessels containing filter media.

BACKGROUND

Pressure vessels or tanks containing filter media are used in the water treatment industry. For instance, these vessels are used in reverse osmosis (RO) systems and water softeners. Currently, when these vessels require maintenance or upgrades, service personnel must enter a confined space to service the vessel, including replacing an inlet and/or outlet. Conventional water treatments systems have a hub/radial outlet collection or a lateral outlet collection. Outlet collection systems usually require support media, such as, gravel or concrete underneath. These outlet collection systems are typically not serviceable from outside the vessel. They may also require removal of all support media prior to servicing. Some traditional methods of distributing water through vessels used by suppliers include resin/media retention screens, piping and manifold, securing to the interior of vessel, an inlet through the top or side of a vessel, and a pipe with a metallic plate diffuser at the base of the pipe. In general, these collection systems may have a short-circuited flow due to the type of media used.

Conventional collection drains have ring headers involving interconnected drains for collecting filtered water. These ring headers allow for preferential water flow, but they result in an unbalanced flow through the tank or vessel. This may also cause short circuiting of the water flow which leads to early breakthrough and shortening of media life.

For these reasons, there is a need for a technically and economically viable solution that optimizes flow through pressure vessels, optimizes media to eliminate short-circuit flow, all while being fully serviceable from outside the vessel.

SUMMARY OF THE INVENTION

According to an embodiment, a diffuser screen for a pressure vessel containing filter media can include: a screen pipe; a solid plate coupled to a base of the screen pipe; and a winged diffuser, wherein the winged diffuser can be arranged around an outer circumference of the solid plate. The winged diffuser can include a plurality of foldable wings. The wings can be arranged in a radial array, in one or more layers, around a retaining ring. The retaining ring can be secured to an outer surface of the solid plate. The screen pipe can include a mesh screen having preconfigured interstices therethrough. Incoming feed water can flow into an opening in the screen pipe where it is directed by an inner surface of the solid plate to flow in a diffused manner through the interstices of the mesh screen and the wings at the base of the screen pipe. The diffuser screen is configured to retain the filter media in the pressure vessel during a forward or backflow operation. A securing ring is configured to secure the diffuser screen to an inlet and/or outlet of the pressure vessel.

According to another embodiment, an underdrain filtered water collection system includes: a pair of opposing drainpipes, wherein each of the drainpipes has a plurality of collection drains; and a diffuser screen, wherein the diffuser screen is configured to slide within an outlet in each of the collection drains. Each drainpipe has between two to four collection drains. An orifice plate can be coupled to the outlet of each collection drain to optimize and balance fluid flow.

BRIEF DESCRIPTION OF THE DRAWINGS

The invention will be described in further detail below and with reference to the attached drawings all of which describe or relate to apparatus, systems and methods of the present invention. In the figures, which are not intended to be drawn to scale, each similar component that is illustrated in various figures is represented by a like numeral. In the figures.

DETAILED DESCRIPTION OF THE INVENTION

Depending on the context, all references below to the "invention" may in some cases refer to certain specific embodiments only. In other cases, it will be recognized that references to the "invention" will refer to subject matter recited in one or more, but not necessarily all, of the claims. The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states an apparatus or system "may", "can", "could", or "might" be included or have a characteristic, that particular apparatus or system is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For the purpose of clarity, details relating to technical material that is known in the technical fields related to the invention have not been described in detail so as not to unnecessarily obscure the present invention.

The use of examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Diffuser Screen

Figure 1A:
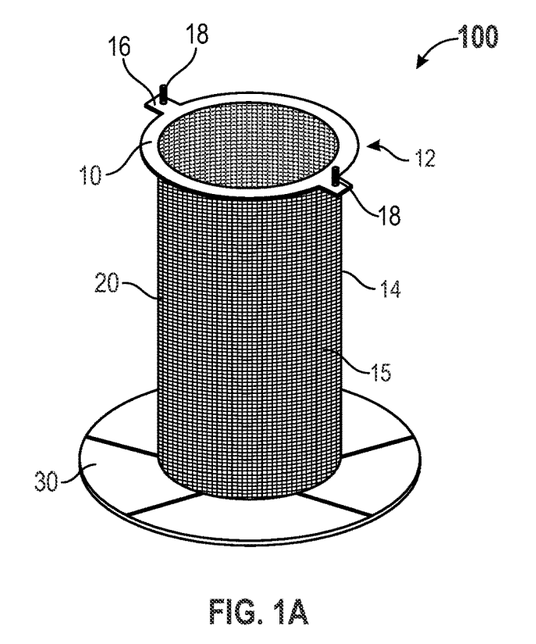
FIGS. 1A-1B illustrate an embodiment of a diffuser screen comprising a winged diffuser.
Figure 1B:
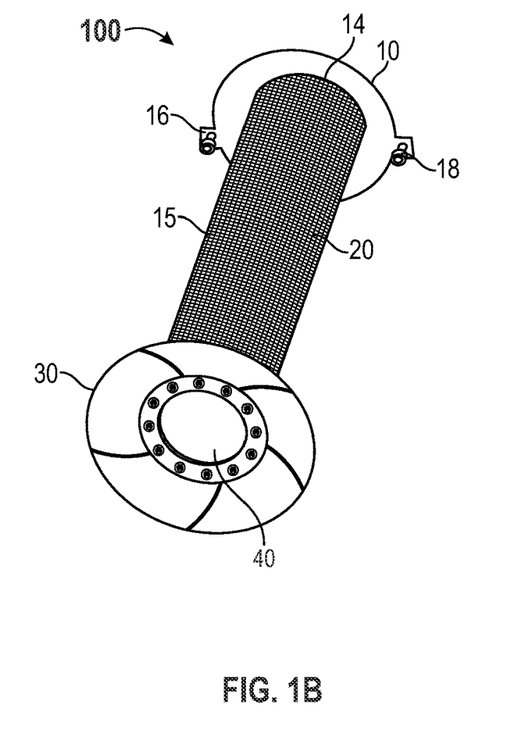

FIGS. 1A and 1B illustrate an embodiment of a diffuser screen device (or a "diffuser screen") 100 for pressure vessels containing filter media for water treatment applications (not shown). The diffuser screen 100 can be used on the inlet and/or outlet openings of the pressure vessels. The diffuser screen 100 is configured to facilitate full serviceability of the pressure vessels without the need for confined space permits (to allow service personnel to enter these spaces) and further eliminates the need for additional service personnel. The diffuser screen 100 comprises a plurality of wings or winged members (both terms used interchangeably herein) which facilitate an optimal flow through the pressure vessel along with optimizing the media life in the pressure vessel.

The diffuser screen 100 comprises a screen pipe 20 having a solid base 40. A securing ring member or, as used hereinafter, a securing ring 10 is coupled to the first end 12 of the screen pipe 20 while a diffuser having a plurality of winged members (or a "winged diffuser") 30 is arranged along an outer circumference of the solid base 40.

The wall of the screen pipe 20 comprises a mesh screen 14. The mesh screen 14 can be a fine metallic mesh having interlaced or intertwined lengths of metallic strands with preconfigured interstices 15 therebetween or therethrough. In an exemplary embodiment, the metallic strands 14 can be made of stainless steel, aluminum, or another suitable material. Feed water is configured to flow into the mesh screen pipe 20 through the opening at the first end of the screen pipe 20 to enter the pressure vessel. The mesh screen 14 is configured to facilitate media retention during forward or backwash operations in the pressure vessel.

Figure 3:
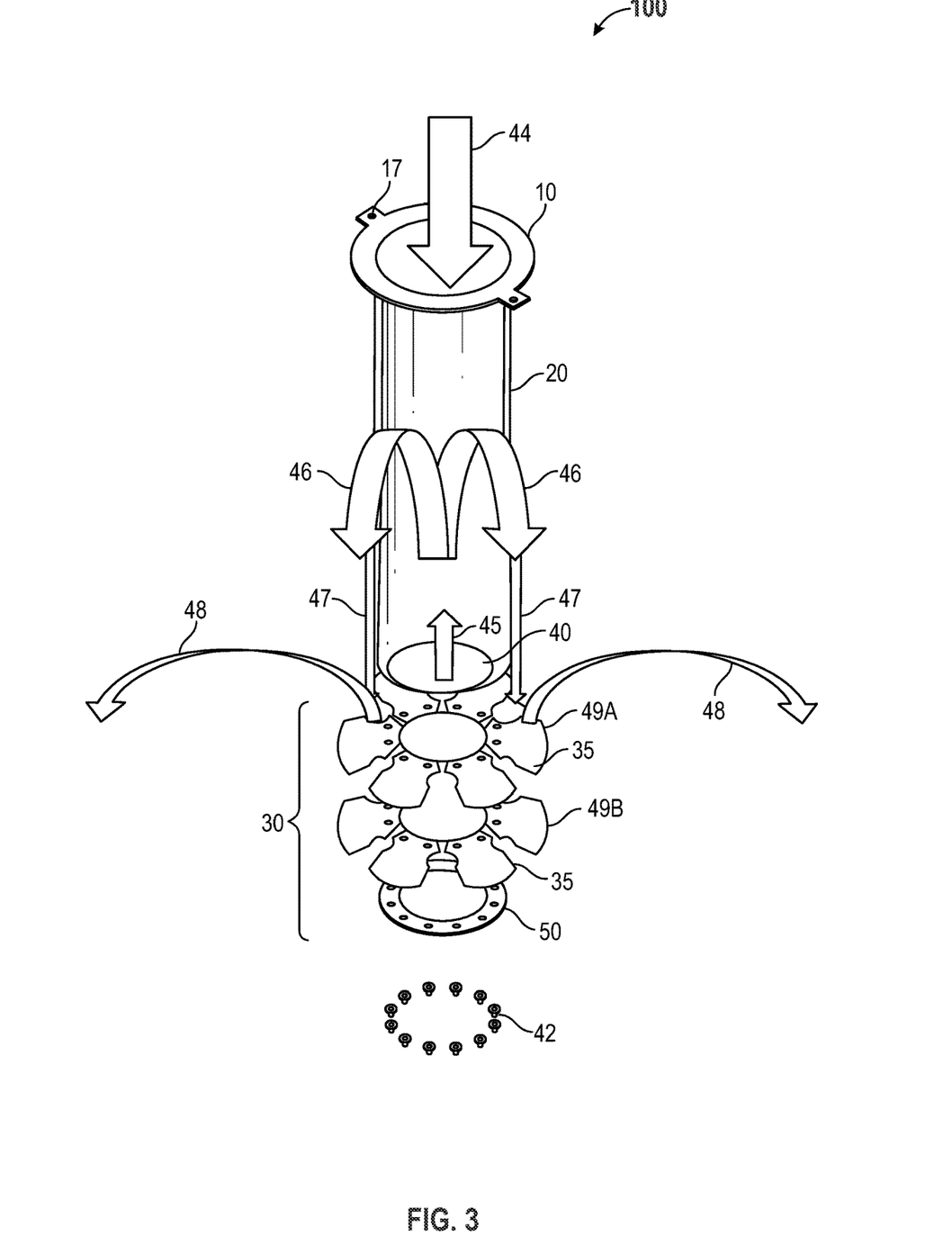
FIG. 3 illustrates an exploded view of the diffuser screen comprising a winged diffuser.

The securing ring 10 can be slid into position at the first end of the screen pipe 20, proximal the opening, to secure the diffuser screen 100 in place between inlet/drain and piping (not shown). The securing ring 10 has a pair of opposing attachment flanges 16. Each flange 16 can include a hole or opening 17 (as shown in FIG. 3) for receiving a securing fastener 18. Examples of fasteners include, without limitations, screws, bolts and other securing means.

The base 40 of the screen pipe 20 comprises a solid metallic plate, such as, a steel plate. The base 40 (along with the winged diffuser 30) can direct the incoming flow of feed water through the mesh screen 14. The base 40 is further configured to facilitate securing of the winged diffuser 30.

FIGS. 2A-2D illustrate an embodiment of the winged diffuser 30. The winged diffuser 30 includes a plurality of winged members or wings 35 arranged in a radial array, in one or more layers, along the circumference of a retaining ring 50. Each wing 35 includes a wing tip 31 and one or more fastener holes 37 proximal to an inner edge 32 that is opposite the wing tip, wherein each fastener hole 37 is configured for receiving one or more wing fasteners 42. The wing fasteners 42 can include, without limitations, bolts, studs, nuts, and other securing means. Each wing 35 can be pivotally fastened or coupled to the retaining ring 50 with the wing fastener 42. In one embodiment, the retaining ring 50 can be anchored with threaded studs (or other fasteners) that are mounted to the solid metal plate 40. In another embodiment, the solid metal plate 40 can include tapped holes (not shown) or openings around its periphery that can be used to bolt together the wings 35 and the retaining ring 50. In an exemplary embodiment, the retaining ring 50 can have an outer diameter of around 9-11 inches.

The wings 35 can be made of a foldable, flexible, elastomeric material so that they can be folded as the diffuser screen 100 is inserted through the inlet or outlet of the pressure vessel, and once it is positioned and secured/bolted in place using the securing ring 10, the wings 35 can be opened within the pressure vessel. The wings 35 can be closed by manually rotating or twisting the diffuser screen 100 during installation or removal. Rotation or twisting of diffuser screen 100 allows the wings 35 to slowly fold inward due to the pressure of the inlet/outlet walls of the pressure vessel on the wings 35. When opened, the wings 35 are configured to act as a flow diffuser. The foldable construction also allows for ease of removal of the diffuser screen from the pressure vessel. In one or more embodiments, the wings 35 can be made of a material such as rubber, plastic, laminate, reinforced fabric or hinged mechanical parts. The winged diffuser 30 is configured to replace a conventional solid metal plate diffuser or another conventional screen diffuser. In one or more embodiments, each wing is between 0.05 to 1 inch or greater in thickness. In an exemplary embodiment, each wing is preferably between 0.08 to 0.150 inches in thickness.

When the diffuser screen 100 is used on the inlet, it (along with the solid base 40) can facilitate optimal distribution of the incoming flow of feed water to the filter media/media bed (not shown). When the diffuser screen 100 is used on the outlet, the wings 35 can optimize the media usage and eliminate short-circuit flows. Conventionally, filter media that is located at the bottom of the pressure vessel may not be used because all of the flow may exit out the top portion of the conventional diffuser screens. The wings 35 of the present invention, however, can guide the flow of water to increase the utilization of the media towards the bottom of the pressure vessel by allowing water to flow around the winged diffuser 30 to exit the tank. Once it is installed at the outlet end, the wings 35 can direct the flow of water around the top of the diffuser screen 100, thereby providing more useable area within the media bed.

The shape of the wings 35 is configured to optimize its ability to be folded. The right and/or left sides/edges 34 of wing 35 has an indentation or cutout 36. In an embodiment, the cutout 36 is semi-circular. In an exemplary embodiment, the cutouts 36 can have a radius of curvature of about 0.30-0.50 inches. The wings 35 are configured to remain positively, negatively or neutrally buoyant during use. The wings 35 and the screen pipe 20 can be made of NSF rated materials. This can allow the wings 35 to either float, sink or sag, or stay neutral in the water filled tank or pressure vessel. This also allows for the control and distribution of flow based on the buoyance of the wings selected.

Figure 2A:
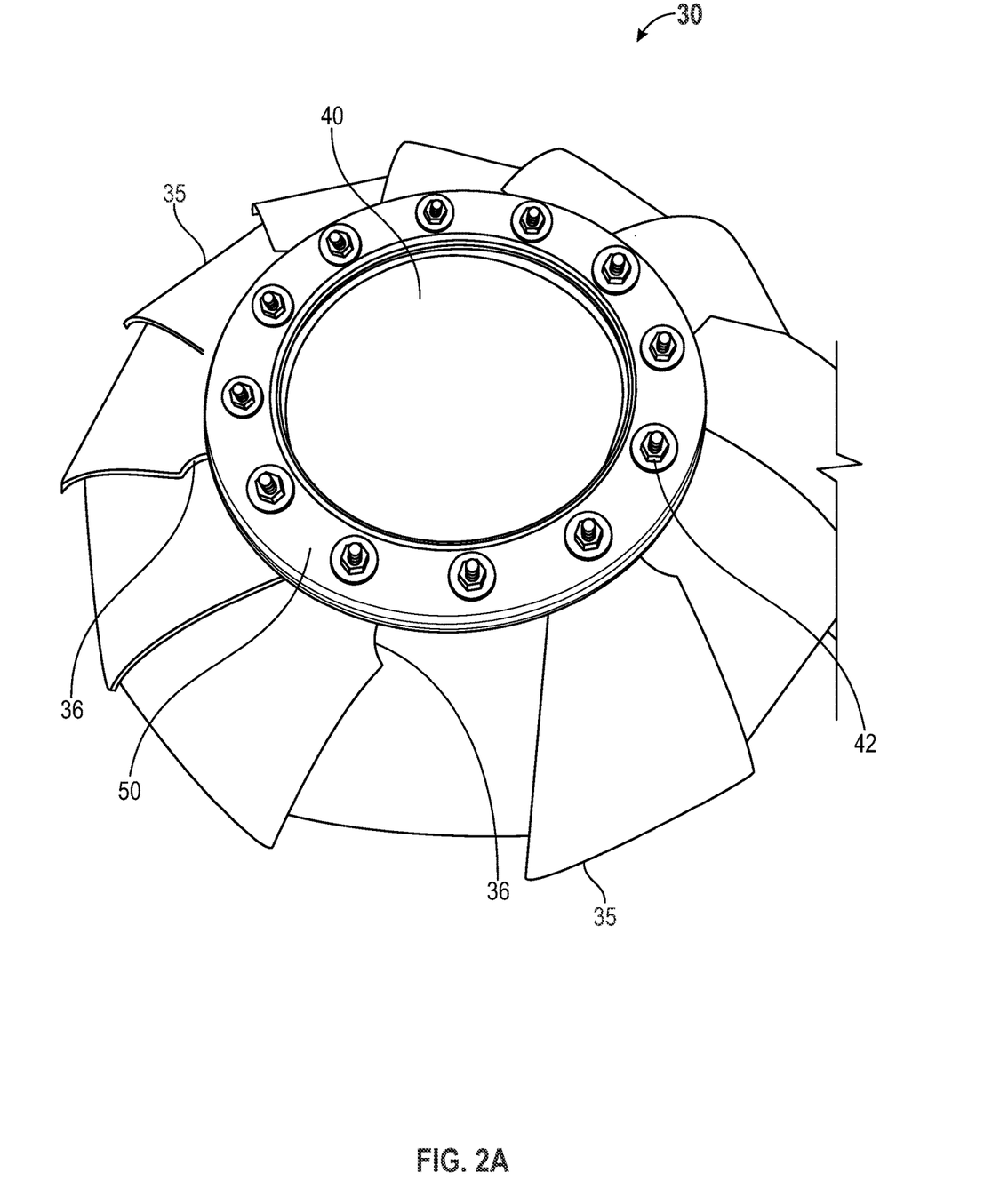
FIGS. 2A-2D illustrate an embodiment of the winged diffuser.
Figure 2B:
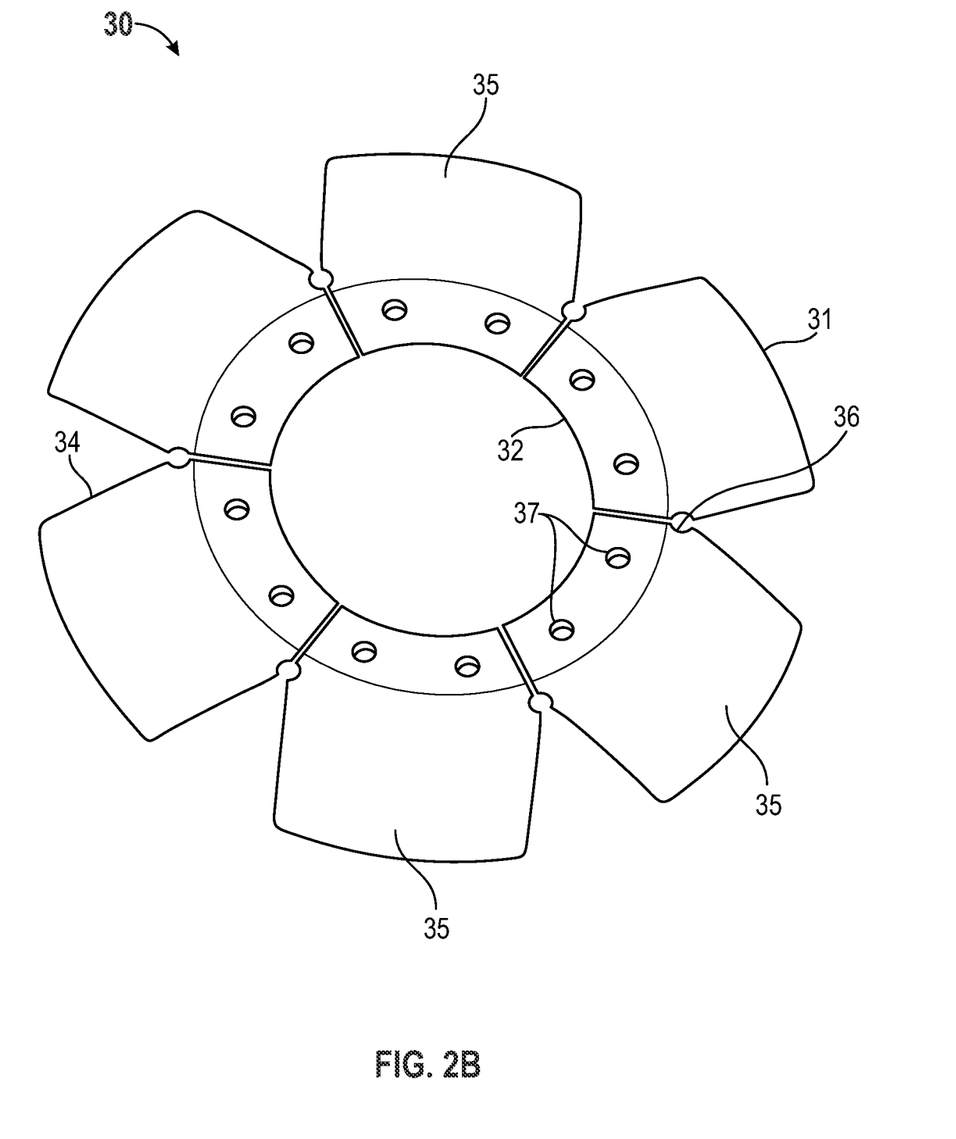
Figure 2C:
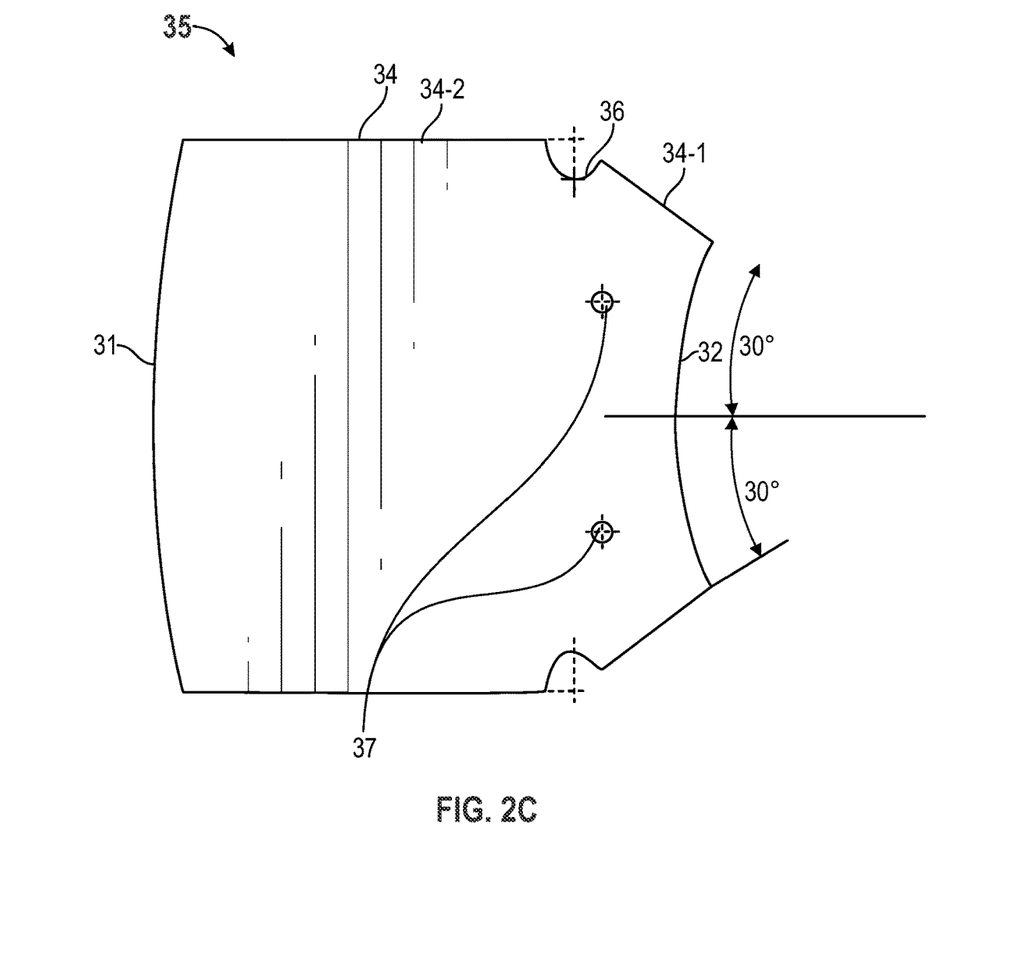

As shown in FIG. 2B, the cutouts 36 can be formed on both edges 34. In an exemplary embodiment, as shown in FIG. 2C, a first portion 34-1 of wing 35 is angled at about 60 degrees. This angle allows the use of six wings in a single layer around the retaining ring 50 to cover the entire circumference of the opening of an inlet or outlet end, that is, the entire diffuser area, of the pressure vessel. However, it is understood that the angle/number of wings can be changed depending on the circumference of the inlet or outlet opening. In another embodiment, as described below, two layers of six wings, that is, a total of twelve wings can be arranged/stacked in either a clockwise or anti-clockwise direction to provide optimal/full coverage. A second portion 34-2 of the wings 35 has a substantially straight edge so that only a small flap is registered when the wings 35 are inserted into the inlet or outlet end of a pressure vessel.

Figure 2D:
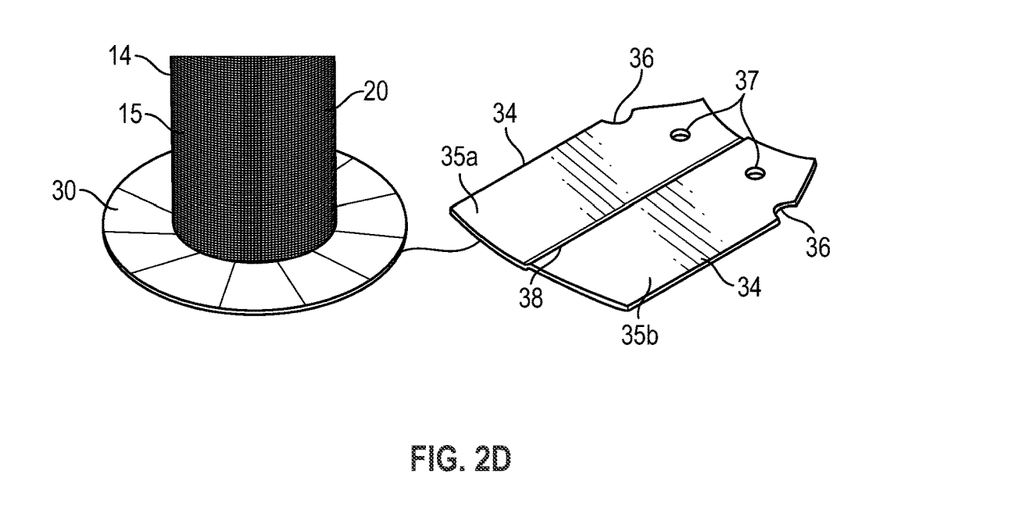

FIG. 2D illustrates another embodiment of wings 35. As shown in FIG. 2D, cutout 36 is formed on only the first edge 34 of adjacent wings 35a and 35b while the second edge 38 of the wings is devoid of a cutout (and, has a straight edge). As shown, the adjacent wings 35a and 35b can be arranged such that the edge 38 of wing 35a, devoid of the cutout, abuts edge 38 of wing 35b. The wings 35a, 35b can be configured to overlap, such as, being arranged in a "shingled" pattern around the retaining ring, or they can be arranged in multiple layers around the retaining ring, to provide full coverage for the screen pipe 20. Shingling or weaving the wings 35 may be done in a clockwise or counterclockwise direction. This shingled or overlapping arrangement of the wings 35 allows for easier insertion of the diffuser screen 100 into the pressure vessel by using a twisting motion, as described hereinafter. If the wings were to be arranged in a single row, they would be so large that they would not be able to fold flat against the screen pipe 20 during insertion.

The elastomeric nature of the wings 35a/35b/35 also facilitates their arrangement in a shingled pattern. This can provide additional coverage, and also additional support to an adjacent overlapping wing. For instance, if a first wing sags, an adjacent overlapping (second) wing to its left counterclockwise, can support the edge of the first wing. This continues with the radial arrangement of the wings along the circumference of the retaining ring 50.

While the size and/or shape of the wings are substantially similar, it is understood that the size and/or shape of the wings may vary, depending on the application requirements.

FIG. 3 illustrates an exemplary method of using the diffuser screen 100. The diffuser screen 100 can be installed at an inlet or outlet opening of a pressure vessel (not shown). Now with reference to FIGS. 1-3, feed water (for example, raw or wastewater to be treated or filtered) flows through the diffuser screen 100 through the opening proximate the first end 12 to enter a pressure vessel (not shown). The solid base 40 facilitates a diffused and distributed flow of the feed water through the screen pipe 20. For instance, the stream of water flows into the screen pipe 20, illustrated by arrow 44. The stream of water is configured to bounce off the solid internal bottom of the base 40, as shown by arrow 45, and be directed along the mesh screen 14, as shown by arrows 46. This water flows downward through the interstices 15 of the mesh screen 14, as shown by arrows 47, to reach the wings 35 arranged in a radial pattern around the retaining ring 50 using wing fasteners 42. The wings 35 can be stacked or shingled in two layers 49a and 49b. The wings 35 are configured to diffuse the flow of water, as shown by arrows 48.

Thus, the diffuser screen 100 is a flexible device having a single screened pipe that can be bolted/secured in place and can be quickly and easily removed for service or replacement outside of the pressure vessel, without having to remove any filter media from the tank/pressure vessel. Conveniently, the one or more flexible wings 35 can also be replaced/exchanged when required without any operational downtime while also allowing for fluid distribution and collection optimization. Accordingly, the diffuser screen 100 is configured as a convenient vessel-based apparatus that allows for maintenance to be performed external of the vessels or tanks. It also overcomes the conventional limitations for maintaining pressure vessels in confined spaces requiring permits and additional manpower. The diffuser screen 100 can be easily serviceable/replaceable if damaged or clogged. Conveniently, the diffuser screen 100 can be used in a drainage system to eliminate short-circuiting of flow at drain top. Advantageously, since the filter media does not have to be removed and replaced every time a maintenance operation is carried out, it results in optimizing media life.

Underdrain Filtered Water Collection Systems

Figure 4:
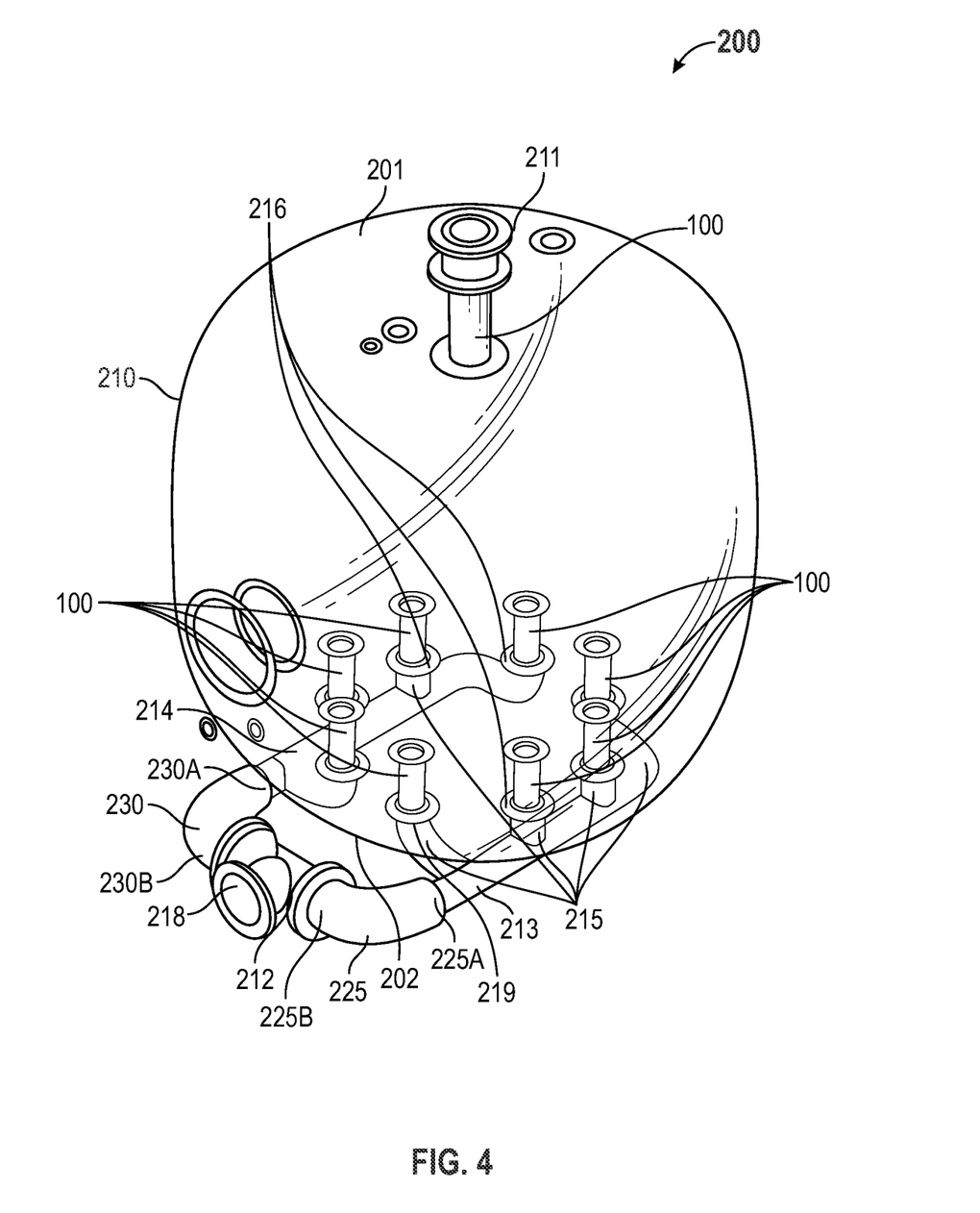
FIG. 4 illustrates an embodiment of an underdrain filtered water collection system.
Figure 5:
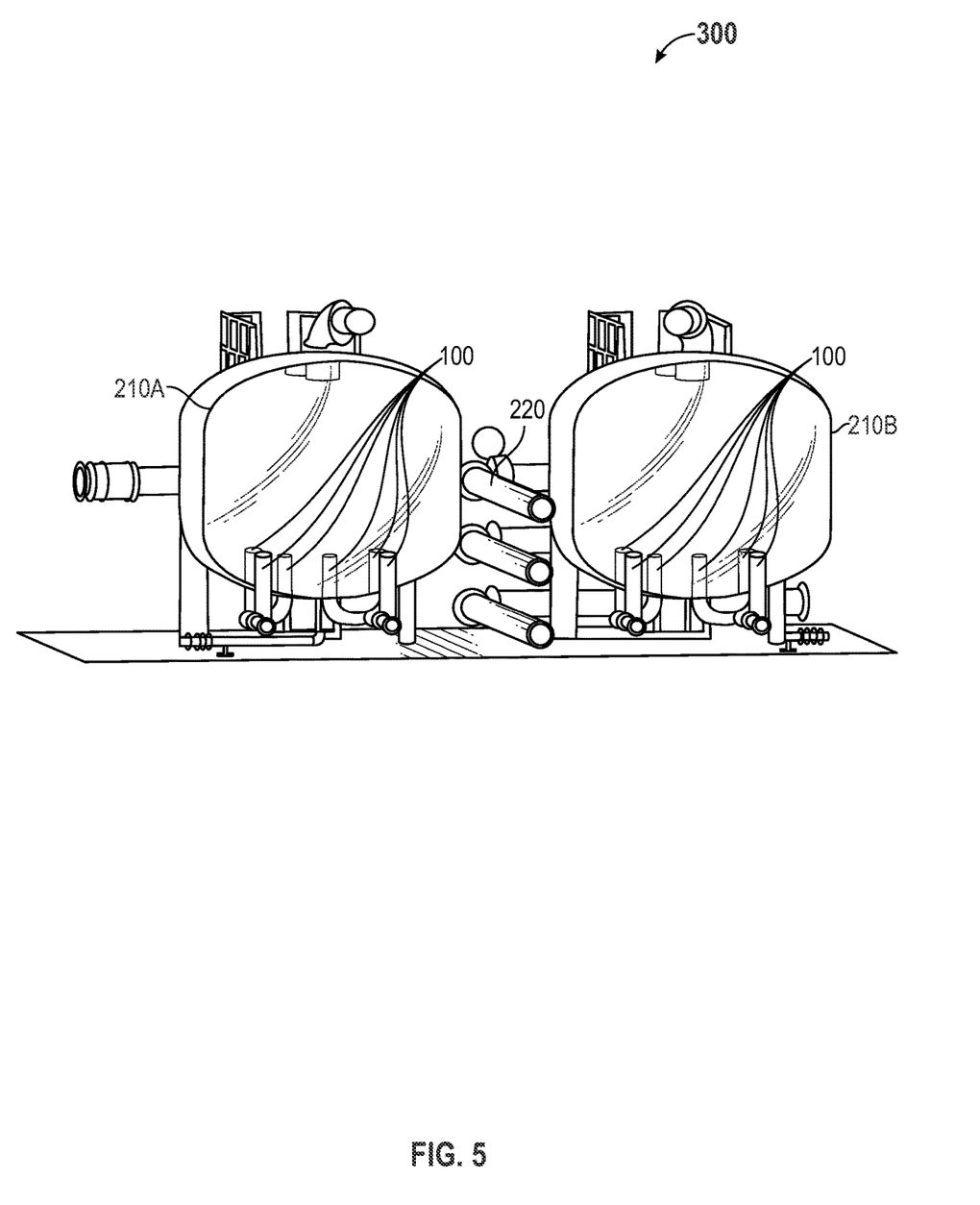
FIG. 5 illustrates another embodiment of an underdrain filtered water collection system.

FIG. 4 illustrates an exemplary underdrain filtered water collection system 200. The collection system 200 can include a tank or pressure vessel 210. In another embodiment, as shown in FIG. 5, an underdrain filtered water collection system 300 has two pressure vessels 210A, 210B which are connected in series using a central piping tree 220. In one or more embodiments, vessel or pressure vessel 210A can be used to feed pressure vessel 210B. It is also understood that more than two pressure vessels can be connected in series, and all such variations are within the scope of this present invention. The central piping tree 220 can be used to control and distribute the flow of water between the vessels. In one or more embodiments, piping means can be used to transport the filtered effluent directly to a distribution or storage tank, or to another vessel for further treatment.

The collection systems 200, 300 are configured to optimize water flow through the pressure vessels 210 and 210A, 210B (together referred to as "210"). Each vessel 210 can include a raw water influent piping/line (not shown) and a filtered or treated water effluent line (not shown).

Now referring to FIG. 4, the pressure vessel 210 can be constructed from any suitable material. The pressure vessel 210 has a fully symmetrical design. The pressure vessel 210 is configured to receive raw and/or pre-treated water as an influent stream. The influent stream is filtered as it flows from the top 201 of the pressure vessel 210 towards its base 202, through adsorption media (not shown) contained in the vessel, and collected in a plurality of collection drains proximate the base 202.

Any type of adsorption or filter media, known in the art, can be used for filtering the influent stream. These can include, without limitation, ion exchange resin, activated carbon, and any other suitable media. The pressure vessel 210 can also include one or more ports which can be slid in or removed from outside the vessel. For instance, the pressure vessel 210 can include media filling ports (not shown) for introducing a desired media.

The vessel 210 can further include a wash line (not shown) for distributing water to the line. The wash line can be used during a backwash operation to clean the filter media. During the backwash operation, optionally, water can flow through the vessel in an opposite direction (such as, from the base 202 to the top 201) for a predetermined time period to clean the filter media. The vessel 210 can also include a media inlet port (not shown) and piping (not shown) to remove filter media from the vessel. The outlet of the media removal piping is beneath the collection drains.

Like conventional systems, the pressure vessel 210 includes underdrains located at the bottom 202 of the vessel to collect the treated water and support the filter media without allowing it to pass through the filtered water effluent piping. However, unlike conventional systems, the collection systems 200, 300 of the present invention does not involve the use of ring headers. Conventional ring header collection systems allow for preferential water flow using interconnected piping where the piping and/or drain outlets therein have a ring-like appearance. Instead, the collection systems 200, 300 are configured with a pair of opposing drain headers/drainpipes, such as, a first drainpipe 213 and a second drainpipe 214, wherein each drainpipe has a plurality of collection drains 215. For example, each pair drainpipe 213, 214 has between two to four collection drains. The drainpipes 213, 214 may be made of welded steel. Small pressure vessels can be configured with a total of four drains (that is, two collection drains on each drainpipe) while larger vessels can be configured with eight drains (as shown). However, it is understood that the number of drains can be increased or decreased without affecting the scope of the present invention. Moreover, the number of drains can be based on physical piping limitations, and the drainage area required, so as to produce a minimal pressure drop across the diffuser screen 100.

An outlet end of first drainpipe 213 is connected to the first end 225A of outlet pipe 225 while the outlet end of second drainpipe 214 is connected to the first end 230A of outlet pipe 230. The second end 225B of outlet pipe 225 and the second end 230B of outlet pipe 230 is connected to opposing ends of flange 212. Flange 212 has an opening 218. Piping (not shown) can be inserted into the opening 218 to carry filtered effluent out of the pressure vessel 210. In one or more embodiments, the inner diameter of outlet pipes 225, 230 is larger than the inner diameter of the drainpipes 213, 214 to allow for a combination of flow from the drainpipes without creating a large pressure drop.

The bottom 202 of the vessel 210 can include one or a plurality of outlet openings or orifices 216. Diffuser screens, such as the diffuser screen 100 of the present invention, can be inserted into these openings 216, as described earlier. The vessel 210 can also include one or a plurality of inlet openings 211 at the top 201 (or side of the vessel). A diffuser screen 100 can also be inserted at the opening inlet 211. In one or more embodiments, the arrangement of the drains allows insertion of the diffuser screens 100 from the outside.

Thus, the collection system 200 (and, similarly collection system 300) is configured to assist in a balanced flow of water through the vessel 210. The balanced water flow through the filter media ensures that there is limited short circuiting of the water flow thereby avoiding breakthroughs and shortening of media life.

In one or more embodiments, the inlet 211 and outlet 216 openings can additionally (or alternately, that is, instead of the diffuser screen 100) include a screen having a conventional v-wire or wedge wire construction so that particulate matter that passes through the screen does not get stuck or entrapped in the screen. Alternately, any conventional diffuser screen can be used at the inlet and/or outlet openings.

The flow from the drains can be optimally balanced by utilizing an orifice plate 219 on each drain outlet. Additionally, flow can be optimized and balanced for each drain outlet by using a series of progressively smaller orifice plates. The orifice plates 219 may be made of any suitable material including stainless steel, carbon steel, or steel.

The collection system 200 allows for a more balanced drainage because it distributes the flow from the pressure vessel in two separate drainpipes 213, 214. Each of the two separate drainpipes is then configured to drain into a larger outlet pipe 225, 230, that is coupled to a flange. Draining into the single larger drainage pipe reduces the pressure drop and allows each drain to be balanced with the use of orifice plates 219.

Therefore, the present invention is well adapted to attain the ends and advantages mentioned as well as those that are inherent therein. The previous description is not intended to limit the invention, which may be used according to different aspects or embodiments without departing from the scopes thereof.

Furthermore, the particular illustrative embodiments disclosed above may be altered or modified and all such variations are considered within the scope and spirit of the present invention. While systems and methods are described in terms of "comprising," "containing," or "including" various devices/components or steps, it is understood that the systems and methods also can "consist essentially of" or "consist of" the various components and steps.

We claim:

1. A diffuser screen for a pressure vessel containing filter media, the diffuser screen comprising:
   a cylindrical mesh screen pipe (20) having interstices therethrough permitting fluid flow between an interior of the cylindrical mesh screen pipe and, an exterior thereof, the cylindrical mesh screen pipe having an open upper end;
   a solid metallic plate (40) coupled to a base of the cylindrical mesh screen pipe;
   a plurality of wings (35) collectively defining a diffuser surface, the plurality of wings arranged around and secured to an outer circumference of the solid metallic plate;
   wherein, a stream (44) of water flows into the open upper end of the cylindrical mesh screen pipe (20), and is deflected off the solid metallic plate, through the interstices of the cylindrical mesh screen pipe, striking the diffuser surface and being diffused.

2. The diffuser screen of claim 1, further comprises a securing ring (10), capable of attaching the diffuser screen to either of an inlet or outlet opening of the pressure vessel.

3. The diffuser screen of claim 1, wherein the cylindrical mesh screen pipe is capable of retaining the filter media in the pressure vessel in place during a forward filtering flow or a backflow operation.

4. The diffuser screen of claim 1, further comprising a retaining ring (50), wherein each wing is secured to the retaining ring, and wherein the retaining ring is coupled to the outer circumference of the solid metallic plate.

5. The diffuser screen of claim 4, wherein the plurality of wings is arranged in a radial array around the retaining ring.

6. The diffuser screen of claim 5, wherein the plurality of wings is arranged in a plurality of layers around the retaining ring.

7. The diffuser screen of claim 1, wherein the plurality of wings comprises a flexible or an elastomeric material.

8. The diffuser screen of claim 1, wherein the plurality of wings is capable of being folded.

9. The diffuser screen of claim 1, wherein a semi-circular cutout is formed on at least one of a left and a right edge of each wing.

10. The diffuser screen of claim 1, wherein the diffuser screen is configured to slide within an outlet of one or more collection drains, wherein the one or more collection drains are formed on a drainpipe.

11. The diffuser screen of claim 10, wherein an outlet end of the drainpipe is connected to a first end of a corresponding outlet pipe.

12. The diffuser screen of claim 11, wherein a second end of the outlet pipe is connected to a flange.

13. The diffuser screen of claim 12, wherein the flange has an outlet opening for discharging a filtered effluent.

14. The diffuser screen of claim 10, further comprising a plurality of orifice plates, wherein each orifice plate is coupled to the outlet of the one or more collection drains to optimize and balance fluid flow.

* * * * *